(12) United States Patent
Kunjithapatham et al.

(10) Patent No.: US 7,949,678 B2
(45) Date of Patent: May 24, 2011

(54) SYSTEM AND METHOD FOR FACILITATING ACCESS TO AUDIO/VISUAL CONTENT ON AN ELECTRONIC DEVICE

(75) Inventors: Anugeetha Kunjithapatham, Sunnyvale, CA (US); Simon J. Gibbs, San Jose, CA (US); Priyang Rathod, Mountain View, CA (US); Mithun Sheshagiri, Mountain View, CA (US); Phuong Nguyen, San Jose, CA (US); Alan Messer, Los Gatos, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 455 days.

(21) Appl. No.: 12/124,098

(22) Filed: May 20, 2008

(65) Prior Publication Data

US 2009/0292672 A1    Nov. 26, 2009

(51) Int. Cl.
*G06F 17/30* (2006.01)
(52) U.S. Cl. ...................................................... 707/781
(58) Field of Classification Search .................. 707/781, 707/784, E17.059, 999.006
See application file for complete search history.

(56) References Cited

U.S. PATENT DOCUMENTS

| 7,373,336 B2 * | 5/2008 | Jasinschi et al. ....................... 1/1 |
| 2009/0133048 A1 | 5/2009 | Gibbs et al. |
| 2009/0133059 A1 | 5/2009 | Gibbs et al. |

OTHER PUBLICATIONS

Gutta, S. et al., "TV Content Recommender System", Proceedings of the 17th National Conference on Artificial Intelligence, 2000, pp. 1121-1122, American Association for Artificial Intelligence, The MIT Press, Menlo Park, CA, United States.
Kurapati, K. et al., "A Multi-Agent TV Recommender", Proceedings of "User Modeling 2001: Personalization in Future TV" Workshop, Jul. 2001, 8 pages, Sonthofen, Germany.
Kurapati, K. et al., "Instant Personalization via Clustering TV Viewing Patterns", Proceedings of the 2002 International Association of Science and Technology for Development "Artificial Intelligence and Soft Computing", 2002, 6 pages, ACTA Press, Calgary, AB, Canada.
Lekakos, G. et al., "Delivering Personalized Advertisements in Digital Television: A Methodology and Empirical Evaluation", Proceedings of the AH2002 "Personalization in Future TV" workshop, 2002, pp. 119-129, Malaga, Spain.

* cited by examiner

*Primary Examiner* — Fred I Ehichioya
(74) *Attorney, Agent, or Firm* — Beyer Law Group LLP (57) ABSTRACT

A method and system for facilitating access to content on an electronic device is provided. Facilitating access involves maintaining a temporal log of metadata for content accessed by one or more users, segregated based on time slots; searching the log to detect a pattern related to the metadata for one or more times slots; and constructing a temporal usage profile based on the pattern. The temporal usage profile may be used for recommending appropriate content to a user at an appropriate time.

25 Claims, 4 Drawing Sheets

FIG. 4 ical Engineering, University of Washington, Seattle, WA wireless network, a wired network, or a combination thereof. Examples of CE devices include digital televisions (DTVs, PDAs, media players, etc.).

Figure 1:
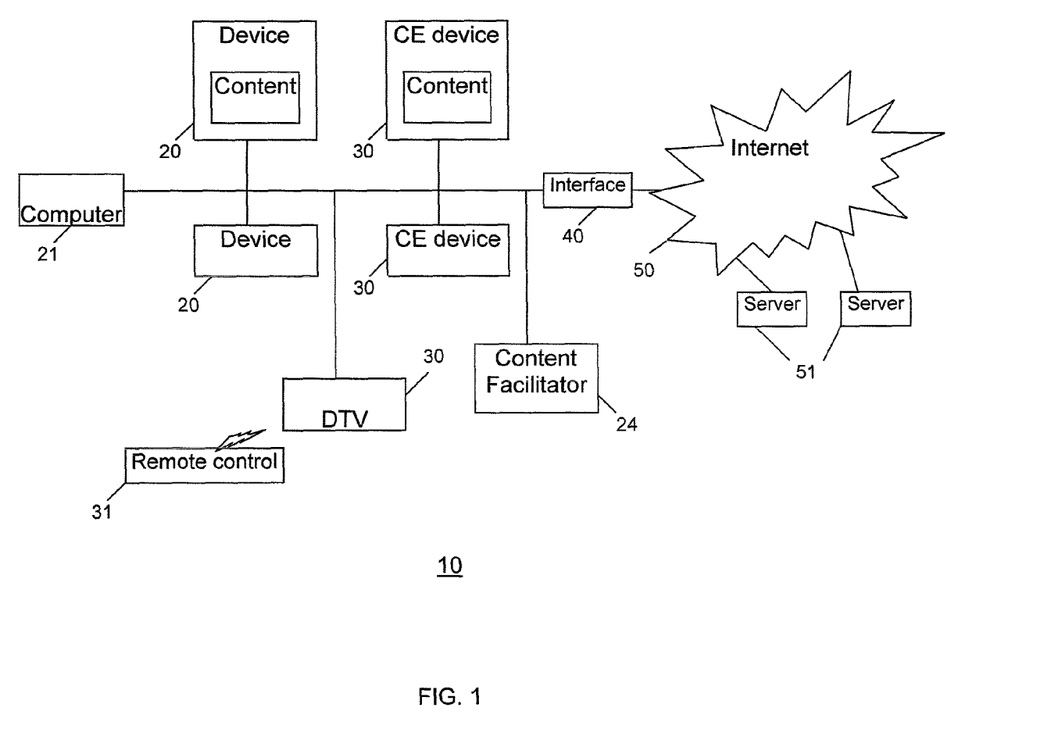

The network 10 further includes a content facilitator system 24 that constructs temporal usage profiles from audio/visual content usage logs for the DTV 30. One implementation constructs temporal usage profiles from TV usage logs, and uses such usage profiles in recommending content to the user.

To aid in the understanding of the function of the content facilitator system 24 initially, certain terminology definitions are provided below. Eight time periods in a week are considered, namely: weekday early-morning, weekday daytime, weekday evening, weekday late-night, weekend early-morning, weekend daytime, weekend evening, and weekend late-night. Monday through Friday is considered "Weekday" and Saturday and Sunday are considered as "Weekend". Further, 4 am-9:59 am is considered "early-morning", 10 am-5:59 pm is considered "daytime", 6 pm-11:59 pm is considered "evening" and 12 am-3:59 am is considered "late-night". The above time periods could be defined/configured in many different ways (e.g., split the day into only three time periods or consider Friday as "Weekend" as well).

Figure 2:
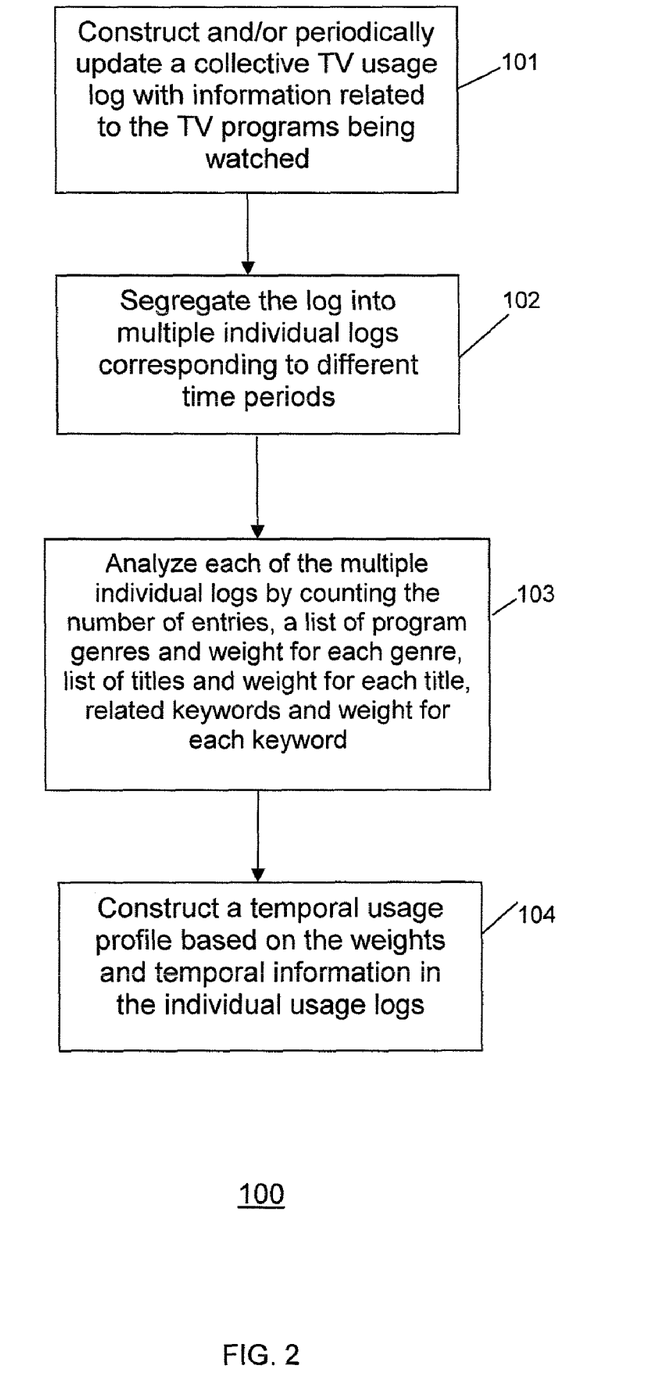

In one scenario, the content facilitator system 24 constructs a temporal usage profile according to a process 100 in FIG. 2, including the following process blocks:

Block 101: Construct and/or periodically update a collective TV usage log with information related to the TV programs being watched on the TV by selection via remote control 31 (e.g., updating can be performed whenever a program is watched for more than 10 minutes). The time and day of the week when a program is watched, along with metadata information for the program (e.g., program title, genre(s)) and related keywords are included in the usage log. The following assumptions are made in this example:
  a. The program metadata information is in the form of an EPG (Electronic Program Guide), available on the TV or a STB connected to the TV.
  b. Significant keywords related to a program can be identified and extracted from the program description or subtitle information available in the EPG and/or the program's closed captions using keyword extraction techniques.

Block 102: Segregate the collective usage log into multiple (e.g., eight) individual logs corresponding to multiple different time periods (e.g., eight time periods defined above). Alternatively, eight different individual logs can be constructed in the previous step, instead of a collective log.

Block 103: Each of the multiple individual logs (e.g., weekday daytime log, weekday evening log, etc.), is analyzed according to the following sub-steps:
  c. The total number of entries (N) available in the individual log is determined.
  d. The genres of the programs appearing in the log are compiled into a single list (e.g., gList) and a weight for each program genre "g" in the gList is determined as W(g) as follows
    i. The number of times the genre "g" appears in the log is identified and stored as n(g).
    ii. Then, the number of unique programs in the log with this genre is identified as $N_u(g)$. Unique programs include programs with distinct titles. In one example, the individual log has the following 3 entries among others:
      #1: TimePeriod: Weekday_Daytime, Title: "Friends", Genre: "Sitcom",
      #2: TimePeriod: Weekday_Evening, Title: "Seinfeld", Genre: "Sitcom",
      #3: TimePeriod: Weekend_Daytime, Title: "Seinfeld", Genre: "Sitcom".
      As such, the number of unique programs within the genre "Sitcom", $N_u$(Sitcom)=2.
    iii. The weight for the genre, W(g), is according to example relation (1) below:

$$W(g) = \left(\frac{n(g)}{N}\right)^{\frac{1}{N_u(g)}}. \quad (1)$$

Relation (1) above lessens the influence of the users' preference for a particular program (e.g., the program "Seinfeld" in the usage log discussed in the previous step) on the weight W(g) for that program genre "Sitcom". Also, the users' preference for a particular program is taken into account when calculating the weight W(g) for program titles. Alternatively, W(g) may be calculated simply as $$\frac{n(g)}{N}$$

(essentially, identifying how frequently the genre "g" appears in the usage log).
  e. The titles of the programs appearing in the individual log are compiled into a single list (e.g., tList) and a weight W(t) for each program title "t" in tList is calculated as follows:
    i. The number of times the title "t" appears in the individual log is identified and stored as n(t).
    ii. The weight W(t) for a title "t" is according to example relation (2) below:

$$W(t)=n(t)/N. \quad (2)$$

f. Similarly, keywords related to the programs appearing in the individual log are compiled into a single list (e.g., kList) and a weight for each keyword "k" in kList is calculated as follows:
    i. The total number of keywords available in the individual log is identified as "K".
    ii. The number of times the keyword "k" appears in the individual log is identified and stored as n(k).
    iii. The weight W(k) for a keyword "k" is calculated using relation (3) below:

$$W(k)=n(k)/K. \quad (3)$$

Block 104: Using the various weights of the genres, titles and keywords calculated in the above steps, and the temporal information associated with the profile, a usage profile is constructed. Example fields determined for the temporal usage profile include:
  i. A temporal tag that specifies the time period that the usage profile corresponds to (e.g., Weekend+DayTime).
  ii. A list of program genres (e.g., "News") along with corresponding weights (e.g., range between 0 and 1, such as 0.78).
  iii. A list of program titles (e.g., "Seinfeld") along with corresponding weights (e.g., ranging between 0 and 1).

iv. A list of keywords along with corresponding weights.

For block 103c above, an entry comprises a set of attributes related to the program that was watched by a user along with the time and day when the program was watched and the total duration (in minutes) the program was watched by the user. Attributes include keywords related to the program (extracted from closed captions embedded in the TV program stream and program description available from an Electronic Program Guide). EPG information may be provided by the cable provider or could be downloaded from some Internet sources such as zap2it. An example of an entry may be: "Tuesday, 6 P.M., 30 minutes, Title: The Oprah Show, Genre: Talk, Credits: Oprah Winfrey, Keywords: Chicago, Oprah Winfrey, President Bush".

Figure 3:
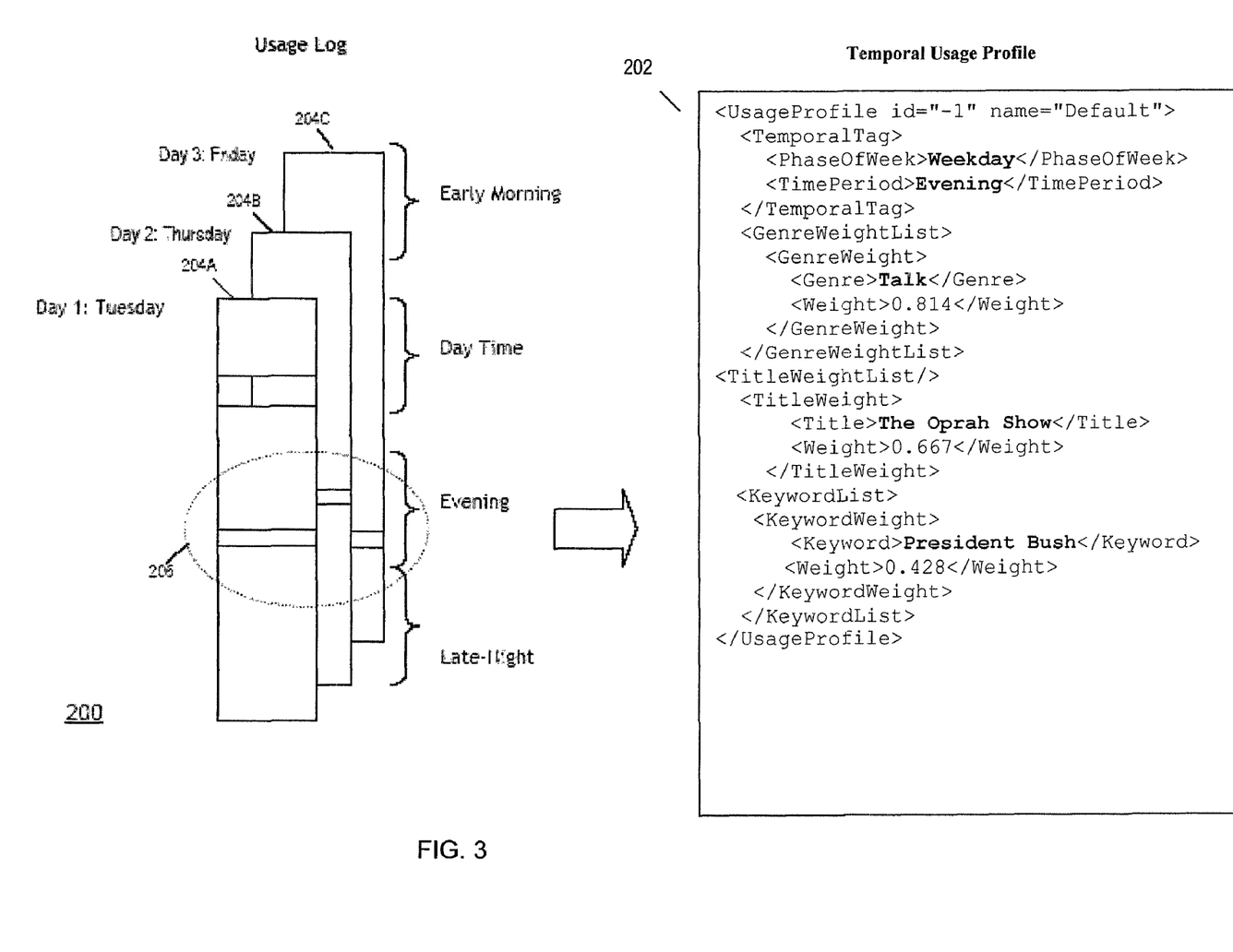

FIG. 3 shows an illustration 200 of constructing a temporal usage profile 202 from TV usage logs 204A-C for three days (e.g., Tuesday, Thursday, Friday). The periods 206 in the logs 204A-C correspond to programs watched by a user during weekday evenings. In this example, the entries marked within the circle 206 in the logs 204A-C include:

Log 204A: "Tuesday, 7 P.M., 20 minutes, Title: The Oprah Show, Genre: Talk, Credits: Oprah Winfrey, Keywords: Chicago, President Bush";

Log 204B: "Thursday, 6 P.M., 60 minutes, Title: The Oprah Show, Genre: Talk, Credits: Oprah Winfrey, Keywords: President Bush, Barack Obama, US Elections";

Log 204C: "Friday, 7:30 P.M., 30 minutes, Title: NewsHour with Jim Lehrer, Genre: News, Credits: Jim Lehrer, Keywords: President Bush, US Elections".

Given these entries, the content facilitator system 24 constructs a temporal usage profile according to the process 100 in FIG. 2, according to the following example steps:

1. The temporal aspects (time and day watched) of the entries are first analyzed. Since all the three entries occur on a weekday and evening, the temporal tag is identified as PhaseOfWeek: Weekday and TimePeriod: Evening.
2. A list of genres occurring in the entries is compiled and a weight for each of those genres is as described. Weights for genres "News" and "Talk" are calculated using the equation:

$$W(g) = \left(\frac{n(g)}{N}\right)^{\frac{1}{N_u(g)}}$$

For g="Talk", N 3, n(g)=2, $N_u(g)$=2.

$$W(\text{Talk}) = \left(\frac{2}{3}\right)^{\frac{1}{2}} = 0.814$$

For g="News", N=3, n(g)=1, $N_u(g)$=1.

$$W(\text{News}) = \left(\frac{1}{3}\right)^{\frac{1}{1}} = 0.333$$

3. Then, a list of program titles occurring in the entries is compiled and a weight for each of those titles is calculated as described. Weights for titles "The Oprah Show" & "NewsHour with Jim Lehrer" are calculated using the equation:

$$W(t)=n(t)/N$$

For title, t="The Oprah Show":: N=3 and n(t)=2,
W("The Oprah Show")=2/3=0.667
For title, t="NewsHour with Jim Lehrer":: N=3 and n(t)=1,
W("NewsHour with Jim Lehrer")=1/3=0.333

4. Then, a list of keywords occurring in the entries is compiled and a weight for each of those keywords is calculated as described. Weights for keywords "Chicago", "President Bush", "US Elections", etc. are calculated using the equation:

$$W(k)=n(k)/K$$

For title, t="Chicago":: K=7 and n(k)=1,
W("Chicago")=1/7=0.142
For title, t="President Bush":: K=7 and n(k)=3,
W("President Bush")=3/7=0.428
For title, t="US Elections":: K=7 and n(k)=2,
W("US Elections")=2/7=0.285.

5. Then, the genres, titles and keywords with weights greater than 0.35 are used to construct a temporal profile. Accordingly, genre=Talk and News, title="The Oprah Show" and keyword="President Bush" are used to construct the profile.
6. The temporal profile is represented using XML. The various elements, sub-elements and attributes that make up the Usage Profile XML description are described below by example:

UsageProfile
UsageProfile is the root element in the Usage Profile XML representation.
Id
Id is an attribute of the root element UsageProfile and, when the profile is registered, uniquely identifies the profile. Possible values of this attribute are:'−1' (the profile is not registered) or a numerical value.
Name
Name is an attribute of the root element UsageProfile and represents the name for the profile.
TemporalTag
TemporalTag is a sub-element of the root element UsageProfile. It further comprises two sub-elements: PhaseOfWeek and TimePeriod.
PhaseOfWeek
PhaseOfWeek is a sub-element of the element TemporalTag. Possible values of this element in the current implementation include: Weekday and Weekend.
TimePeriod
TimePeriod is a sub-element of the element TemporalTag. Possible values of this element in the current implementation include: EarlyMorning, DayTime, Evening and LateNight.
GenreWeightList
Genre WeightList is a sub-element of the root element UsageProfile. It further comprises zero or more entries of the sub-element: Genre Weight.
GenreWeight
GenreWeight is a sub-element of the element Genre WeightList. It further comprises two sub-elements: Genre and Weight.
Genre
Genre is a sub-element of the element Genre Weight. It takes a xsd:string as a value and cannot be null.
Weight
Weight is a sub-element of the element GenreWeight. It takes a xsd:double as a value and cannot be null.
TitleWeightList Title WeightList is a sub-element of the root element UsageProfile. It further comprises zero or more entries of the sub-element: Title Weight.

Title Weight

Title Weight is a sub-element of the element Title WeightList. It further comprises two sub-elements: Title and Weight.

Title

Title is a sub-element of the element Title Weight. It takes a xsd:string as a value and cannot be null.

Weight

Weight is a sub-element of the element Title Weight. It takes a xsd:double as a value and cannot be null.

KeywordWeightList

KeywordWeightList is a sub-element of the root element UsageProfile. It further comprises of zero or more entries of the sub-element: KeywordWeight.

KeywordWeight

KeywordWeight is a sub-element of the element KeywordWeightList. It further comprises two sub-elements: Keyword and Weight.

Keyword

Keyword is a sub-element of the element KeywordList. It takes a xsd:string as a value and cannot be null.

Weight

Weight is a sub-element of the element KeywordWeight. It takes a xsd:double as a value and cannot be null.

Figure 4:
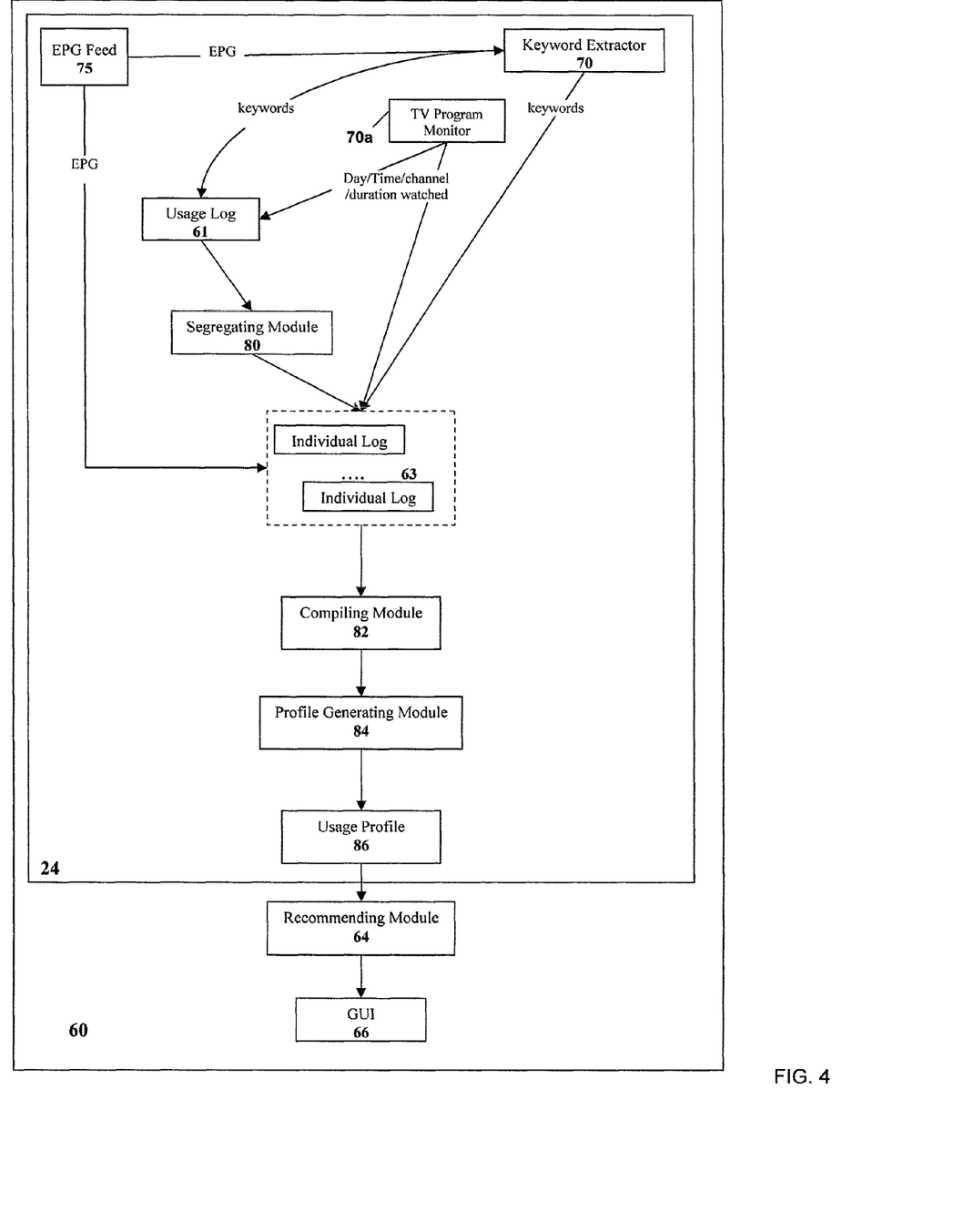

FIG. 4 shows a functional block diagram of a content recommending system 60 that operates in conjunction with programming accessed (e.g., watched, recorded, etc.) using the DTV 30 (FIG. 1). The content recommending system 60 includes said content facilitator 24, a recommending module 64 and a user interface 66, according to an embodiment of the invention. The facilitator 24 includes a keyword extractor 70 implementing the process block 101 (above). In one example, the keyword extractor 70 extracts information from closed captions of a program using natural language processing (NLP) techniques and the Electronic Program Guide (EPG) information 75. The keyword extractor 70 operates on broadcast signals and processes a steady stream of closed caption text entering the system. The keyword extractor 70 maintains two history windows over the stream of incoming text. A smaller, most recent window, spans the last N (N=5 in our prototype) sentences ($S_t$) and a larger program wide window covers the entire TV program/current news story/current program section, etc. Only the keywords extracted from the program wide window are stored and indexed for temporal use profile constructions. Also, the keywords extracted from the most recent window are ranked higher than others. A closed caption (CC) Tokenizer function receives the stream of CC text and breaks it down into sentences. This is done in order to preserve the grammar of the text. A tagger function then tags sentences, e.g., using Brill's part-of-speech tagging. The tagger analyzes the sentence and determines how each word is used in the sentence. The tagger uses lexical rules to assign an initial tag to each word in a sentence, and then uses contextual rules to update the tag based on the context in which the word occurs. The contextual rules are sensitive to the grammar of the input sentence. Ungrammatical or incomplete sentences may result in incorrect tagging of the words in the sentence. In one example, for an input sentence: "John Wayne ran home": The output of tagger would be:

John<PROP>Wayne<PROP>ran<VB_PST>home<NOUN>

This indicates that in the previous sentence, "John" and "Wayne" are used as proper nouns, "ran" is a verb in past tense and "home" is a noun.

This tagged sentence from the tagger is then passed on to a rule engine function which extracts keywords from the tagged sentence based on extraction policy rules from a rule library. A rule library, R, is an exhaustive set of rules that can be used to extract different kinds of phrases appearing in the sentence. The rules are represented as tag patterns. For example, it may have a rule to extract consecutive proper nouns (<PROP>+) and another rule to extract an adjective followed by one or more nouns (<ADJ> <NOUN>+), etc. A rule selector includes a mapping from genre to an extraction policy. The genre of the program being watched determines the type of keywords to extract from the closed captions. For example, if the program being watched is a high-content, factual program such as news, the extraction policy is highly aggressive, essentially extracting additional differing types of keywords (e.g., sequences of nouns, compound nouns, proper nouns, etc.). On the other hand, if the program is a low-content, non-factual program such as a sitcom, a very conservative extraction policy is used, extracting keywords very selectively, extracting only those keywords considered as having a higher likelihood of being useful (e.g., only proper nouns). The rule engine alters its extraction behavior depending upon the type of program being watched.

Each extraction policy, $P_e$, corresponds to a subset of the rules in R. This mapping can either be preset, or it can be learned. The mapping essentially defines the kinds of patterns to be used for extracting keywords from a particular type (genre) of program. The rule engine applies the extraction policy on the text received from the tagger and extracts keywords from it. These keywords may then be weighted based on whether they occur in the most recent window. The weighted keywords are then ordered. The extracted keywords identify information of potential interest to the user(s), to be used for generating a temporal usage profile.

The content facilitator 24 further includes a log segregation module 80 implementing the process block 102 (FIG. 2) in generating individual logs 63 from the collective log 61, or in another example, the keyword extractor 70 may directly generate individual logs 63 instead of the collective log 61, as discussed in relation to block 102. The facilitator 24 further includes a compiling module 82 implementing the process block 103, and a usage profile constructing module 84 implementing the process block 104. The usage profile constructing module 84 generates a temporal usage profile 86, which can be utilized by the recommending module 64 to recommend content/information to user(s) on the user interface 66 that may be displayed on the DTV 30 (FIG. 1). For example, the recommending module 64 uses the temporal usage profile 86 for recommending videos at an appropriate time to user(s), such a program and time that is likely preferred by the user. Seed data such as common viewer stereotypes or explicitly specified user preferences, are not required in constructing the usage profile. Examining keywords related to watched programs helps identify user preferences at a finer granularity and derive a more precise usage profile.

The collective usage log 61 or individual logs 63 are generated using "keywords" provided by the Keyword Extractor 70 and EPG entries from the EPG Feed 75. A TV Program Monitor 70a provides the date/time, duration and channel information corresponding to TV programs watched by the user.

In the above-described embodiment, temporal usage profiles may be generated programmatically from TV usage logs 61 (or 63). In an alternative embodiment according to the invention, explicit user preferences (e.g., preferences regarding types of programs user(s) would like to watch in general, on certain days, holidays, etc.) may be merged/blended with an automatically generated temporal usage profile to generate a more precise profile. In another embodiment, the weights for features (e.g., title and keywords) for a viewed program may be calculated in different ways.

For example: in the implementation described above, the weight for a title (W(t)) is calculated as below:

$$W(t)=n(t)N,$$

where, n(t) is the number of times a title t appears in the individual logs and N is total number of entries in the log. In another example, W(t) may also be calculated as:

$$W(t) = \left(\frac{n(t)}{N}\right)^{\frac{1}{N_u(t)}},$$

where, $N_u(t)$ is the number of unique programs in the log with the title t. In one example, the individual log has the following 3 entries among others:

1: TimePeriod: Weekend_LateNight, Title: "Saturday Night Live", Host: "Tom Hanks",
2: TimePeriod: Weekend_LateNight, Title: "Saturday Night Live", Host: "Tom Hanks",
3: TimePeriod: Weekend_LateNight, Title: "Saturday Night Live", Host: "Carrie Underwood".

The number of unique programs in this log with the title "Saturday Night Live" can be calculated as 2. Here, we are using the "Host" attribute in the program log to represent uniqueness of a program. Similarly, the "director" or "writer" attribute values may instead be used to represent the uniqueness of the program.

Further, other types of metadata for a watched program (e.g., actor, director, year of release) may also be analyzed by the keyword extractor 70 in addition to genre, title and keywords.

As noted, pre-defined time-spans (e.g., weekday evening, weekend daytime) are used to analyze the usage logs corresponding to said time-spans to create temporal usage profiles. Alternatively, a clustering or co-clustering approach may be applied over the TV usage logs to identify clusters of similar usage patterns and then create usage profiles for time-spans when the usage clusters recur.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method for facilitating access to content on an electronic device, comprising:
    maintaining a temporal log of metadata for content accessed by one or more users, segregated based on predetermined time slots;
    searching the log to detect a pattern related to the metadata for the predetermined time slots using the lexical rules and contextual rules, wherein the searching the log includes searching the metadata to detect a temporal metadata pattern and determining a numeric weight for metadata features in the detected pattern, the numeric weight representing potential user interest in corresponding accessed content;
    constructing a temporal usage profile based on the numeric weight for the metadata; and
    displaying recommended content at a user preferred time based on the temporal usage profile.

2. The method of claim 1, wherein the metadata comprises electronic program guide information for audio/visual accessed content.

3. The method of claim 1, wherein the metadata includes closes caption information for audio/visual accessed content.

4. The method of claim 1, wherein the metadata includes keywords or tags related to accessed content.

5. The method of claim 1, wherein detecting a pattern includes detecting a significant pattern based on electronic program guide information and closed caption information, for the accessed content.

6. The method of claim 1, wherein detecting a pattern further includes determining a numeric weight for frequently appearing metadata features.

7. The method of claim 1 further including recommending appropriate content at an appropriate time based on the temporal usage profile.

8. The method of claim 1, wherein pattern comprises word sentences.

9. The method of claim 8, further comprising:
    assigning tags for words in a sentence based on grammar.

10. The method of claim 9, wherein the contextual rules update the tags based on word context.

11. The method of claim 10, further comprising:
    mapping content genre to an extraction policy for determining type keywords to extract.

12. The method of claim 1, further comprising:
    updating the temporal usage profile based on remote control program selection.

13. An apparatus for facilitating access to content on an electronic device, comprising:
    a keyword extractor configured for maintaining a temporal log of metadata for content accessed by one or more users, segregated based on predetermined time slots;
    a compiling module configured for searching the log to detect a temporal metadata pattern related to the metadata for the predetermined times slots using lexical and contextual rules and determining a numeric weight for metadata features in the detected pattern;
    a temporal profile construction module configured for:
        constructing a temporal usage profile based on the pattern and the numerical weight for the metadata; and
        displaying recommended content at a user preferred time based on the temporal usage profile.

14. The apparatus of claim 13, wherein the metadata comprises electronic program guide information for audio/visual accessed content.

15. The apparatus of claim 13, wherein the metadata includes closed caption information for audio/visual accessed content.

16. The apparatus of claim 13, wherein the metadata includes keywords or tags related to accessed content.

17. The apparatus of claim 13, wherein the compiling module is further configured for detecting a significant pattern based on electronic program guide information and closed caption information, for the accessed content.

18. The apparatus of claim 13, wherein the compiling module is further configured for determining a numeric weight for frequently appearing metadata features.

19. A system for facilitating access to content on an electronic device, comprising:

a keyword extractor configured for maintaining a temporal log of metadata for content accessed by one or more users, segregated based on predetermined time slots;

a compiling module configured for searching the metadata to detect a temporal metadata pattern for the predetermined times slots using lexical and contextual rules and for determining a numeric weight for metadata features in the detected pattern;

a temporal profile construction module configured for constructing a temporal usage profile based on the pattern and the numerical weight for the metadata; and a recommending module configured for recommending appropriate content at a user preferred time based on the temporal usage profile.

20. The system of claim 19, wherein the metadata comprises one or more of:

electronic program guide information for audio/visual accessed content, closed caption information for audio/visual accessed content, keywords or tags related to accessed content.

21. The system of claim 20, wherein the compiling module is further configured for detecting a significant pattern based on the metadata, for the accessed content.

22. The system of claim 21, wherein the compiling module is further configured for determining a numeric weight for frequently appearing metadata features.

23. The system of claim 19 wherein:

the compiling module is further configured for detecting a pattern for metadata features including one or more of: genre, title, keyword, or tag information;

the compiling module is further configured for determining a numerical weight for said metadata features; and the temporal profile construction module is further configured for constructing a temporal usage profile based on one or more of the numerical weights, indicating potential user interest in content related to the corresponding accessed content.

24. A program product stored on a computer useable medium for facilitating content access for users of an electronic device, the program product comprising program code for causing a computer system to perform the following:

maintaining a temporal log of metadata for content accessed by one or more users, suggested based on predetermined time slots, wherein searching the log includes searching the metadata to detect a temporal metadata pattern and determining a numeric weight for metadata features in the detected pattern, the numeric weight representing potential user interest in corresponding accessed content;

searching the log to detect a pattern related to the metadata for the predetermined times slots using lexical rules and contextual rules;

constructing a temporal usage profile based on the pattern and based on the numeric weight for the metadata; and displaying recommended content at a user preferred time based on the temporal usage profile.

25. A computer-implemented method for facilitating information searching for a user of an electronic device, comprising:

maintaining a temporal log of metadata for content accessed by one or more users, segregated based on predetermined time slots;

searching the log to detect a pattern related to the metadata for the predetermined times slots using lexical and contextual rules, wherein searching the log includes searching the metadata to detect a temporal metadata pattern and determining a numeric weight for metadata features in the detected pattern, the numeric weight representing potential user interest in corresponding accessed content;

constructing a temporal usage profile based on the pattern and based on the numeric weight for the metadata; and displaying recommended content at a user preferred time based on the temporal usage profile.

* * * * *